United States Patent [19]
Tominaga

[11] Patent Number: 5,957,983
[45] Date of Patent: Sep. 28, 1999

[54] AUTOMATIC TRAVELING DEVICE FOR VEHICLES

[75] Inventor: Hiroshi Tominaga, Susono, Japan

[73] Assignee: Toyota Jidosha Kabushiki Kaisha, Toyota, Japan

[21] Appl. No.: 08/805,519

[22] Filed: Feb. 26, 1997

[30] Foreign Application Priority Data

Mar. 13, 1996 [JP] Japan ..................................... 8-056184

[51] Int. Cl.⁶ .......................... G06F 165/00; G06F 15/50; G06K 9/36
[52] U.S. Cl. ................................. 701/23; 701/41
[58] Field of Search .......................................... 701/41, 23

[56] References Cited

U.S. PATENT DOCUMENTS 5,189,612  2/1993  Lemercier et al. ........................ 701/23
5,790,403  8/1998  Nakayama ................................. 701/28

OTHER PUBLICATIONS

Proceedings of the Second World Congress On Intelligent Transport System 1995 Yokohama, vol. III, Nov. 9, 1995, pp. 1069–1074, Makoto Nakamura: The Experiments on Lateral and Longitudinal Control System in ARTS.

Primary Examiner—Jacques H. Louis-Jacques
Assistant Examiner—Olga Hernandez
Attorney, Agent, or Firm—Kenyon & Kenyon

[57] ABSTRACT

A traveling device for calculating the relative displacement of a vehicle in a road using a magnetic sensor and a CCD camera and performing automatic steering. The vehicle is equipped with a magnetic sensor and a CCD camera. A magnetic ECU processes a signal from the magnetic sensor, an image ECU processes a signal from the CCD camera and the resulting relative displacements are both output to a vehicle control computer. When a relative displacement output from the image ECU is not irregular, the vehicle control computer performs steering control after calculating an amount of corrective steering using this relative displacement and, when it is irregular, the vehicle control computer performs steering control after calculating an amount of corrective steering using the relative displacement output from the image ECU.

5 Claims, 2 Drawing Sheets

AUTOMATIC TRAVELING DEVICE FOR VEHICLES

FIELD OF THE INVENTION

The present invention relates to an automatic traveling device for vehicles and in particular to an automatic traveling device for controlling steering by jointly utilizing displacement from a magnetic marker and displacement from lane lines on the road surface.

DESCRIPTION OF THE PRIOR ART

Automatic traveling devices have previously been developed for identifying the position of a vehicle with respect to the road surface and correcting this position as appropriate with automatic steering so as to reduce the driving operations performed by the driver and improve safety.

In general, vehicle position is identified using means such as a method wherein a magnetic sensor installed onboard the vehicle detects magnetic markers provided on the road and relative displacement from the magnetic markers is detected based on this magnetic field strength, or a method wherein a CCD sensor installed onboard the vehicle films the lane lines in front of the vehicle and relative displacement from the line is detected based on the position of the lane line in the image obtained.

For instance, a configuration combining displacement detection using magnetic markers and painted line identification using a CCD camera for controlling vehicle steering was presented in "Experiments on Lateral and Longitudinal Control Systems", "The Experiments on Lateral and Longitudinal Control System in ARTS", Proceedings of the Second World Congress on Intelligent Transport System 1995 Yokohama, Vol. III, Nov. 9, 1995, pp. 1069–1074.

However, since the range of the magnetic field generated by magnetic markers is limited, when the amount of sideways displacement of the vehicle exceeds a certain level, it becomes impossible to execute steering control based on displacement from the magnetic markers. For instance, when detection is carried out with a pair of adjacent magnetic markers provided at a distance of 0.9 meters, detection is only possible within a range of 0.45 meters on either side of the position of the magnetic markers and when this range is exceeded, an incorrect relative displacement value is obtained meaning that steering control cannot be executed. There are no such range limitations when a CCD camera is used for painted line identification, but since this method is essentially utilizing the difference in brightness between the painted line and the remainder of the road it is highly vulnerable to weather conditions.

Although the respective levels of precision in vehicle relative displacement detection using a magnetic sensor and detection using a CCD camera differ according to travelling conditions, such precision differences have not been considered at all in the above-mentioned prior art with the resulting problem that the properties of both sensors have not been sufficiently utilized.

SUMMARY OF THE INVENTION

The present invention addresses the problems of the prior art described above and aims to provide an automatic traveling device capable of performing highly reliable automatic steering using both relative displacement detected based on magnets and relative displacement detected based on lane lines.

In order to achieve these objectives, an automatic traveling device for vehicles of the present invention comprises magnetic displacement detecting means for detecting relative displacement of a vehicle by detecting a magnet field of magnetic markers provided on the road, lane line displacement detecting means for detecting relative displacement of a vehicle by detecting lane lines on the road, irregularity detecting means for detecting irregularity in relative displacement detected by the magnetic displacement detecting means and controlling means for dominantly performing steering control based on a relative displacement detected by the lane line displacement detecting means when an irregularity has been detected by the irregularity detecting means. Here "dominantly" is equivalent to increasing the extent of control and also includes cases in which steering control is performed based on only relative displacement detected by the lane line displacement detecting means and not on relative displacement detected by the magnetic displacement detecting means. In addition, when no irregularity is detected by the irregularity detecting means, the controlling means dominantly performs steering control based on relative displacement detected by the magnetic displacement detecting means.

Furthermore, in order to achieve the above-mentioned objectives, an automatic traveling device for vehicles of the present invention comprises magnetic displacement detecting means for detecting relative displacement of a vehicle by detecting a magnet field of magnetic markers provided on a road, lane line displacement detecting means for detecting relative displacement of a vehicle by detecting a lane line on the road and controlling means for performing steering control by altering the ratio between steering control based on relative displacement detected by the magnetic displacement detecting means and steering control based on relative displacement detected by the lane line displacement detecting means based on a relative displacement value detected by the magnetic displacement detecting means.

Furthermore, in order to achieve the above-mentioned objectives, an automatic traveling device for vehicles of the present invention comprises a magnetic sensor for detecting a magnetic field of magnetic markers provided on a road, a camera for filming the surface of a road in front of a vehicle, a first processor for calculating a first relative displacement with respect to the traveling of the vehicle based on a magnetic field detected by the magnetic sensor, a second processor for processing an image taken by the camera and calculating a second relative displacement with respect to the traveling of the vehicle and a controller for dominantly performing steering control based on a first relative displacement when a first relative displacement detected by the first processor is regular and for dominantly performing steering control based on a second relative displacement when the first relative displacement detected by the first processor is irregular.

DESCRIPTION OF THE PREFERRED EMBODIMENT

A preferred embodiment of the present invention will next be explained with reference to the diagrams.

Figure 1:
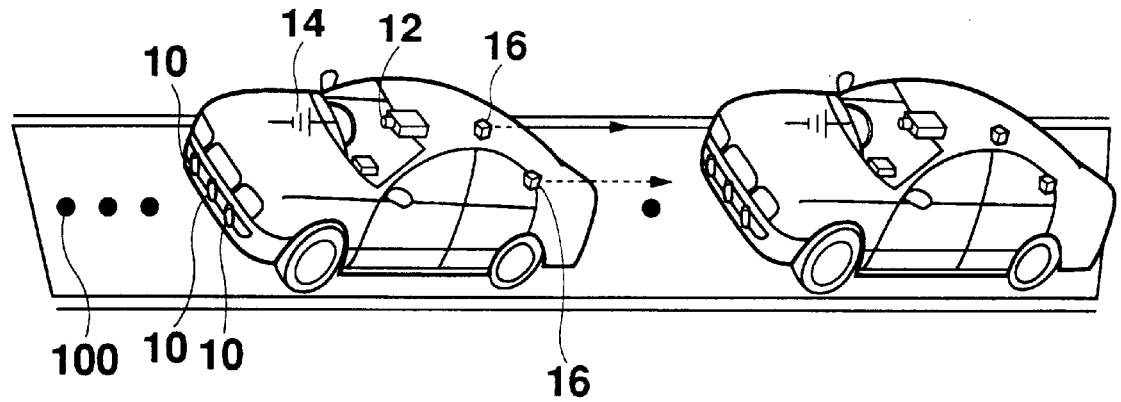
FIG. 1 is a diagram showing a system configuration of an embodiment of the present invention.

FIG. 1 shows a system configuration of this embodiment. Magnetic markers 100 are provided at designated intervals in the road along the direction in which the vehicle is headed and the vehicle is provided with magnetic sensors 10 in order to detect the magnets of these magnetic markers 100. A total of three magnetic sensors 10 are installed uniformly on the lower portion of the front bumper of the vehicle and the relative displacement (sideways displacement) of the vehicle with respect to the magnetic markers 100 is calculated based on the difference between the magnetic field strengths detected by these three magnetic sensors 10. In this embodiment, the magnetic sensors 10 are installed at intervals of 0.4 meters. In addition, a CCD camera 12 provided onboard the vehicle films a designated distance of the road surface in front of the vehicle. A magnetic detection signal from the magnetic sensor 10 and an image signal from the CCD camera 12 are both output to a processor at which first and second relative displacements are independently calculated. In compliance with these relative displacements, a steering actuator 14 steers the vehicle along the magnetic markers 100 or the lane line.

In FIG. 1, an infrared light generator 16 is installed onboard the vehicle for transmitting the steering amount and the like this vehicle to a second vehicle immediately behind it, thereby enabling the second vehicle to perform the same amount of steering control as the first vehicle without having to calculate its own steering amount.

Figure 2:
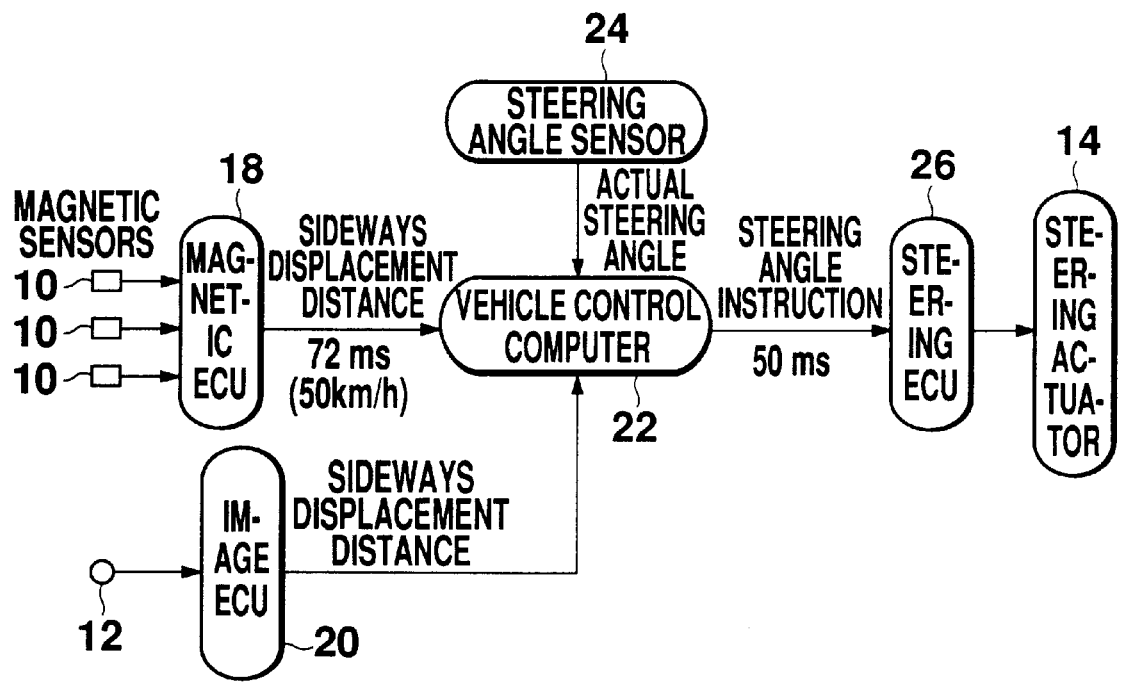
FIG. 2 is a block diagram showing a configuration of the same embodiment.

FIG. 2 shows a block diagram of the vehicular configuration in the present embodiment. Magnetic detection signals are outputted from a pair of magnetic sensors 10 to a magnetic ECU 18 (electronic control unit). The magnetic ECU 18 has a calculator which calculates the relative displacement (sideways displacement) from the magnetic markers 100 based on the difference between the two inputted magnetic detection signals. This relative displacement (first relative displacement) is, for example, positive when the vehicle is displaced to the right of the magnetic markers 100. This relative displacement is output to the vehicle control computer 22. Meanwhile, a CCD camera 12 sends an image signal to an image ECU 20 which detects the position of the lane line within the image. The painted line can, for instance, be detected by dividing the inputted image into two values and matching them with a two-value pattern (template) of the lane line prepared in advance. In this matching process, a rectangular search area is first designated in the image obtained and the template is moved sequentially within the search area. The sum of the brightness differences is calculated and the position at which this sum has its smallest value is deemed as the matching position. The same process is then carried out in the next search area, and so on. Eventually, the position of the lane line can be detected from the matching positions of all the search areas. Once the lane line has been detected, the relative displacement of the vehicle with respect to the lane line (second relative displacement) is calculated based on the onboard position of the camera, focal distance, and such like. This relative displacement is also output to the vehicle control computer 22. In addition, a steering angle sensor 24 inputs the present steering angle to the vehicle control computer 22. One present steering angle and two relative displacements are thus input to the vehicle control computer 22.

The vehicle control computer 22 then determines whether or not the relative displacement calculated by the magnetic ECU 18 has an irregular value. When the value is not irregular, the vehicle control computer 22 sends a corrective steering amount instruction based on the relative displacement from the magnetic ECU 18 to a steering ECU 26. Based on this instruction value, the steering ECU 26 drives a steering actuator 14 to execute steering. Alternatively, when the vehicle control computer 22 has determined that the relative displacement from the magnetic ECU 18 shows an irregular value, the vehicle control computer 22 calculates a corrective steering amount based on the relative displacement output from the image ECU 20 and sends an instruction to the steering ECU 26. In this embodiment, the relative displacement from the magnetic ECU 18 shows an irregular value when the sideways displacement of the vehicle has exceeded ±0.4 meters. This is because a relative displacement output from the magnetic ECU 18 is determined as unreliable when an allocated margin of ±0.05 meters is reached, since in principle it is not possible to calculate sideways displacement based on a signal from the magnetic sensors when the sideways displacement of the vehicle is greater than ±0.45 meters (i.e., greater than half the distance between the magnetic sensors). Moreover, since it is conceivable that a malfunction may occur in the magnetic markers 100 themselves, the vehicle control computer 22 also deems a relative displacement from the magnetic ECU 18 to be irregular when the value detected differs greatly from the immediately preceding value.

Steering control is thus based on the relative displacement from the image ECU 20 when the relative displacement outputted from the magnetic ECU 18 is irregular. However, the vehicle control computer 22 continues to monitor relative displacement from the magnetic ECU 18 during steering control based on relative displacement from the image ECU 20 and when the magnetic ECU 18 relative displacement has returned to a regular value, steering control is once again performed based on the magnetic ECU 18. For instance, relative displacement from the magnetic ECU 18 returns to a regular value when the vehicle resumes travelling along the lane line with the result that relative displacement from the magnetic markers 100 falls to less than ±0.40 meters. It is therefore possible to perform steering control based on relative displacement output from the magnetic sensors while switching to steering control based on relative displacement sent from the CCD camera when the precision of the magnetic sensors 10 deteriorates.

Figure 3:
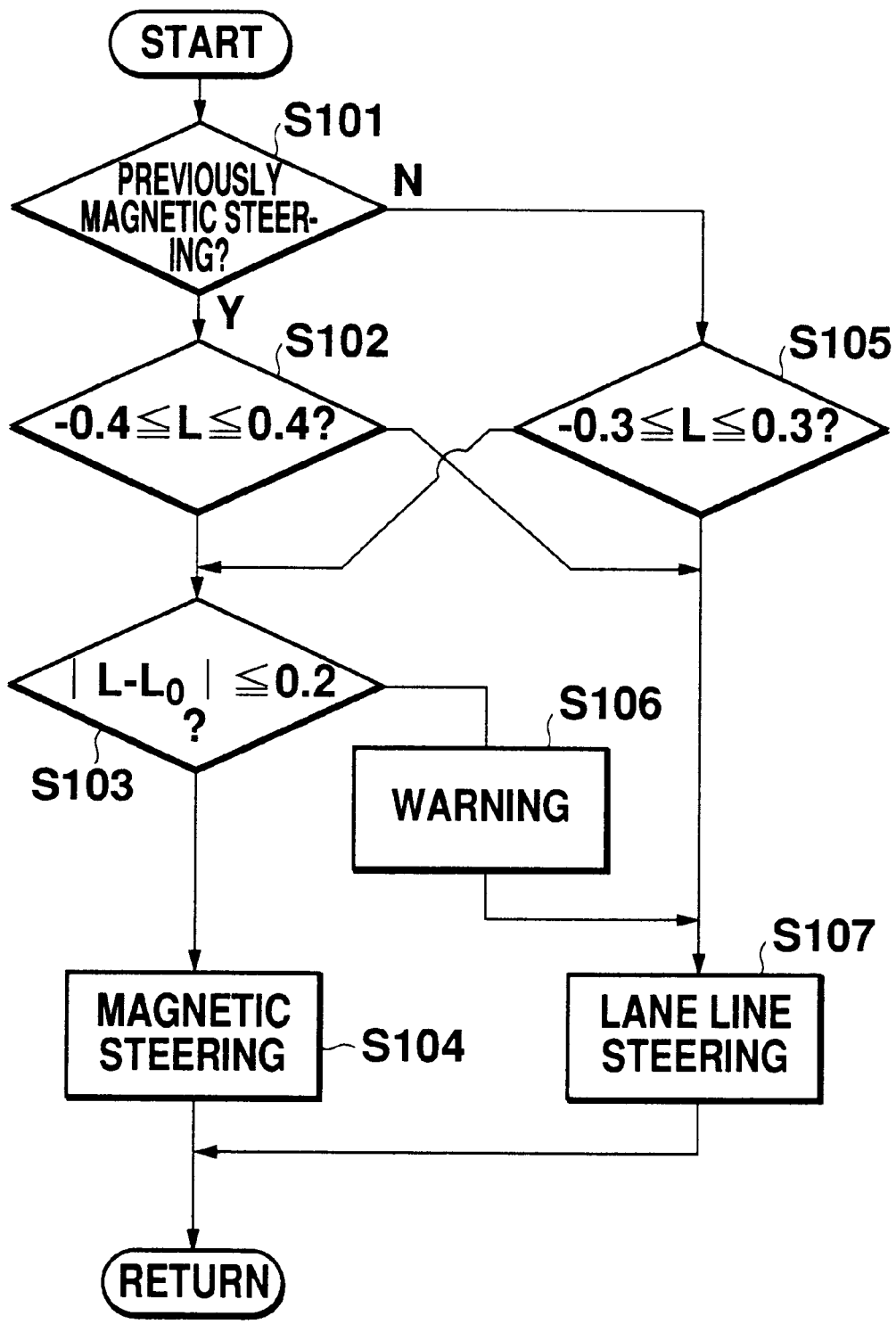
FIG. 3 is a processing flowchart of the same embodiment.

The processing sequence of vehicle control computer 22 will next be explained in detail using the processing flowchart shown in FIG. 3. First, it is determined whether or not steering in the preceding control timing was magnetic steering (S101). "Magnetic steering" here denotes steering control based on a relative displacement outputted from the magnetic ECU 18. When the steering in the preceding control timing was magnetic, it is next determined whether or not the present magnetic ECU 18 relative displacement L satisfies: $-0.4 \leq L \leq 0.4$ (S102). As explained above, this is to determine whether relative displacement L is an irregular value. When relative displacement L lies within the above-defined range, the difference between the present relative displacement L and the immediately preceding relative displacement L0 is calculated and it is determined whether or not this difference is within a permitted range (0.2 meters in the present embodiment) (S103). When there is no considerable change in the difference between the present and preceding relative displacements, we can determine that there has been no magnetic sensor malfunction and that the present relative displacement is regular; magnetic steering is therefore carried out based on relative displacement L outputted from magnetic ECU 18 as in the preceding control (S104). With map data defining a predetermined steering amount expressed as $FF_{MAP}$ and designated feedback gains expressed as FB and $FB_2$, magnetic steering is carried out by calculating the corrective steering amount ΔS in the following equation:

[Equation 1]

$$\Delta S = FF_{MAP} + FB \cdot L + FB_2 \cdot dL/dt \quad (1)$$

The first term from the right in the above equation is required in order to revert the present sideways displacement to 0 from a designated distance; the second term from the right is required to reduce the present sideways displacement of the vehicle; the third term from the right is required to take into account the direction in which the vehicle is presently headed. By carrying out control in this manner, sideways displacement can be gradually reduced and the position of the vehicle can be brought into alignment with the position of the magnetic markers 100.

Alternatively, if for some reason the vehicle moves to a considerable distance from the magnetic markers 100 and it is consequently determined at S102 that the relative displacement L exceeds the ±0.4 meter range, processing shifts to lane line steering (S107). "Lane line steering" here denotes steering control based on relative displacement obtained from the image ECU 20 and is carried out by calculating a corrective steering amount ΔS from the following equation, in which relative displacement of a vehicle is expressed as $L_w$ and a predetermined feed-forward gain as FF and $FF_2$:

[Equation 2]

$$\Delta S = FF \cdot L_w + FF_2 \cdot dL_w/dt \quad (2)$$

When it is determined at S103 that the difference between the preceding relative displacement L0 and the present relative displacement L exceeds the permitted range of 0.2 meters even though relative displacement was within the ±0.4 meter range at S102, this is also treated as an irregularity and processing shifts to lane line steering (S107). However, in this case, since there is a strong possibility that the magnetic markers 100 have suffered a malfunction, a warning to that effect should preferably be relayed to the driver before shifting to lane line steering (S106).

Although steering shifts to lane line steering when magnetic steering has become impossible, the vehicle control computer 22 monitors relative displacement from the magnetic ECU 18 even during the lane line steering and determines whether or not it satisfies: −0.3≦L≦0.3 (S105). This is in order to determine whether or not the relative displacement from the magnetic ECU 18 has returned to a regular value. The threshold value has here been set at ±0.3 rather than ±0.4 so as to maintain control stability. When relative displacement from the magnetic ECU 18 has returned to a regular value after corrective painted line steering has been carried out, the process shifts back to S103 and resumes magnetic steering after confirming that there has been no malfunction (S104).

The above explanation of this embodiment concentrated on magnetic steering with painted line steering providing supplementary control when magnetic steering is no longer possible. This was due to the fact that CCD cameras are highly susceptible to weather or the like, whereas a method using magnetic sensors is by comparison less susceptible to environmental conditions. When weather conditions are favorable (i.e., there is no rain, cloud, or the like) and sufficient difference in brightness can be obtained between lane lines and the other areas of the road for lane line steering to be carried out, steering can be controlled primarily with painted line steering or with a combination of both magnetic sensor and lane line displacements. In such a case, processing for comparing a relative displacement $L_w$ from the image ECU 20 and a relative displacement L from the magnetic ECU 18 could for instance be added between S103 and S104 in the processing flowchart in FIG. 3. Then, when it has been determined that the difference between the two values is within a designated range and the relative displacement brightness obtained from the CCD camera 12 is sufficient, a corrective steering amount ΔS can be calculated from the following equation, in which feed-forward gain is expressed as FF and feedback gain as FB and $FB_2$:

[Equation 3]

$$\Delta S = FF \cdot L_w + FB \cdot L + FB_2 \cdot dL/dt \quad (3)$$

The first term on the right of the above equation denotes lane line steering and the second term from the right denotes magnetic steering. It is envisaged that, by combining feed-forward and feedback terms in this way, the vehicle can be more effectively prevented from wandering or swerving and steering control can be carried out smoothly.

This can be effectively carried out using the above-mentioned equation 3 as the basic control equation and by setting the FB and $FB_2$ values at a relatively high value in comparison with FF in the processing at S104 so that magnetic steering control is dominant, while setting the FF value at a relatively high value in comparison with FB and the like in the processing at S107 so that lane line steering is dominant, thereby adjusting the ratios of the magnetic steering control and the lane line steering control.

Furthermore, it is also possible to continuously increase or decrease the values of FF, FB and $FB_2$ in compliance with the size of the magnetic relative displacement L.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An automatic traveling device for vehicles comprising:
   (a) magnetic displacement detecting means for detecting a relative displacement of a vehicle from magnetic markers by detecting a magnetic field of the magnetic markers provided on the road;
   (b) lane line displacement detecting means for detecting relative displacement of the vehicle from a lane line by detecting the lane line on the road;
   (c) irregularity detecting means for detecting irregularities in the relative displacement detected by the magnetic displacement detecting means; and
   (d) controlling means for dominantly performing steering control based on the relative displacement detected by the lane line displacement detecting means when an irregularity has been detected by the irregularity detecting means; wherein
   the controlling means dominantly perform steering control based on the relative displacement detected by the magnetic displacement detecting means when there are no irregularities detected by the irregularity detecting means.

2. The automatic traveling device for vehicles according to claim 1, wherein
   the irregularity detecting means determines an irregularity has occurred when a relative displacement value has exceeded a first designated range.

3. The automatic traveling device for vehicles according to claim 2, wherein the irregularity detecting means determines no irregularity has occurred when the relative displacement value has moved within a second designated range which is smaller than the first designated range after the relative displacement value has previously exceeded the first designated range.

4. The automatic traveling device for vehicles according to claim 1, wherein the irregularity detecting means determines an irregularity has occurred when a difference between a current relative displacement value and an immediately preceding relative displacement value exceeds a designated value.

5. An automatic traveling device for vehicles, comprising:

(a) a magnetic sensor for detecting a magnetic field of magnetic markers provided on a road;

(b) a camera for filming the surface of a road in front of a vehicle;

(c) a first processor for calculating a first relative displacement of a vehicle from the magnetic markers based on a magnetic field detected by the magnetic sensor;

(d) a second processor for processing an image taken by the camera and calculating a second relative displacement of the vehicle from a lane line on the road; and (e) a controller for dominantly performing steering control based on the first relative displacement when the first relative displacement detected by the first processor is regular and for dominantly performing steering control based on the second relative displacement when the first relative displacement detected by the first processor is irregular.

* * * * *